United States Patent
Saimen

(10) Patent No.: US 11,781,204 B2
(45) Date of Patent: Oct. 10, 2023

(54) POWDER FOR MOLD

(71) Applicant: Sanyo Special Steel Co., Ltd., Himeji (JP)

(72) Inventor: Yuka Saimen, Himeji (JP)

(73) Assignee: Sanyo Special Steel Co., Ltd., Himeji (JP)

( * ) Notice: Subject to any disclaimer, the term of this patent is extended or adjusted under 35 U.S.C. 154(b) by 0 days.

(21) Appl. No.: 17/041,041

(22) PCT Filed: Mar. 22, 2019

(86) PCT No.: PCT/JP2019/012270
§ 371 (c)(1),
(2) Date: Sep. 24, 2020

(87) PCT Pub. No.: WO2019/188854
PCT Pub. Date: Oct. 3, 2019

(65) Prior Publication Data
US 2021/0025042 A1  Jan. 28, 2021

(30) Foreign Application Priority Data

Mar. 27, 2018  (JP) ................................ 2018-059288

(51) Int. Cl.
| | | |
|---|---|---|
| *C22C 38/04* | (2006.01) | |
| *C22C 38/22* | (2006.01) | |
| *C22C 38/32* | (2006.01) | |
| *B22F 1/052* | (2022.01) | |
| *B22F 5/00* | (2006.01) | |
| *C22C 38/30* | (2006.01) | |
| *B33Y 70/00* | (2020.01) | |
| *C22C 33/02* | (2006.01) | |
| *C22C 38/02* | (2006.01) | |
| *C22C 38/24* | (2006.01) | |
| *B22F 10/28* | (2021.01) | |
| *B22F 10/34* | (2021.01) | |

(52) U.S. Cl.
CPC .............. *C22C 38/22* (2013.01); *B22F 1/052* (2022.01); *B22F 5/007* (2013.01); *B33Y 70/00* (2014.12); *C22C 33/0257* (2013.01); *C22C 38/02* (2013.01); *C22C 38/04* (2013.01); *C22C 38/24* (2013.01); *C22C 38/30* (2013.01); *C22C 38/32* (2013.01); *B22F 10/28* (2021.01); *B22F 10/34* (2021.01); *C22C 33/0278* (2013.01); *C22C 33/0285* (2013.01); *Y02P 10/25* (2015.11)

(58) Field of Classification Search
CPC ...................................................... C22C 38/04
See application file for complete search history.

(56) References Cited

U.S. PATENT DOCUMENTS

| | | |
|---|---|---|
| 10,173,258 B2 | 1/2019 | Kawano |
| 10,273,567 B2 | 4/2019 | Issac |
| 11,131,012 B2 | 9/2021 | Medvedeva et al. |
| 2012/0321505 A1 | 12/2012 | Barbosa et al. |
| 2016/0348222 A1* | 12/2016 | Isaac .................. C22C 38/50 |
| 2020/0140979 A1 | 5/2020 | Valls Angles |

FOREIGN PATENT DOCUMENTS

| | | |
|---|---|---|
| EP | 2503016 A1 | 9/2012 |
| JP | 4661842 B2 | 3/2011 |
| JP | 2015209588 A | 11/2015 |
| JP | 2015224363 A | 12/2015 |
| JP | 2017507251 A | 3/2017 |
| WO | 2017109233 A1 | 6/2017 |
| WO | 2017111680 A1 | 6/2017 |
| WO | 2017217913 A1 | 12/2017 |

OTHER PUBLICATIONS

ASM International Handbook Committee. (1990). ASM Handbook, vol. 01—Properties and Selection: Irons, Steels, and High-Performance Alloys. ASM International. Retrieved from https://app.knovel.com/hotlink/toc/id:kpASMHVPS1/asm-handbook-volume-01/asm-handbook-volume-01 (Year: 1990).*
Markforged, Material Datasheet H13 Tool Steel, https://static.markforged.com/downloads/h13-tool-steel.pdf, Accessed May 15, 2023 (Year: 2018).*
Mazur et al., "SLM additive manufacture of H13 tool steel with conformal cooling and structural lattices", Rapid Prototyping Journal, 2016, pp. 504-518, vol. 22:3.
Casati et al., "Microstructure and mechanical behavior of hot-work tool steels processed by Selective Laser Melting", Materials Characterization, 2018, pp. 50-57, vol. 137.
Gang et al., "Laser Advanced Manufacturing Technology and Its Application", National Defense Industrial Press, Oct. 2016, p. 296. (English-Language Translation of the Relevant Portion of the Chinese Office Action).

* cited by examiner

*Primary Examiner* — Jophy S. Koshy
(74) *Attorney, Agent, or Firm* — THE WEBB LAW FIRM

(57) ABSTRACT

Provided is a powder for metal molds that is less likely to cause solidification cracking even in a process involving rapid melt-quenching solidification. The powder for metal molds is made of an alloy. The alloy includes C: 0.25 mass % to 0.45 mass %, Si: 0.01 mass % to 1.20 mass %, Mn: more than 0 mass % to 1.50 mass %, Cr: 2.0 mass % to 5.5 mass %, and V: 0.2 mass % to 2.1 mass %. The alloy further includes at least one of Mo: more than 0 mass % to 3.0 mass %, W: more than 0 mass % to 9.5 mass %, and Co: more than 0 mass % to 4.5 mass %. The balance of the alloy is Fe and incidental impurities. The alloy satisfies the expression: (Mn %)$^3$/S %>6.7. The total content of P, S and B in the alloy is 0.020 mass % or less.

11 Claims, No Drawings

POWDER FOR MOLD

CROSS-REFERENCE TO RELATED APPLICATIONS

This application is the United States national phase of International Application No. PCT/JP2019/012270 filed Mar. 22, 2019, and claims priority to Japanese Patent Application No. 2018-059288 filed Mar. 27, 2018, the disclosures of which are hereby incorporated by reference in their entirety.

BACKGROUND OF THE INVENTION

Field of the Invention

The present invention relates to a powder suitable for materials for metal molds. In particular, the present invention relates to a powder suitable for materials for metal molds produced by methods of manufacturing shaped articles involving a rapid melt-quenching solidification process, such as three-dimensional additive manufacturing.

Description of Related Art

Three dimensional (3D) printers are used in manufacturing shaped metal articles. In these 3D printers, the shaped articles are manufactured by an additive manufacturing method. In the additive manufacturing method, spread metal powder is irradiated with a laser beam or an electron beam. This irradiation melts particles of the metal powder and the particles then solidify. Such particles are bonded to each other through the melting and the subsequent solidification. Irradiation is selectively applied to some portions of the metal powder. Unirradiated portions in the powder do not melt. Bonded layers can be formed only in the irradiated portions.

Additional metal powder is spread over the bonded layers. This metal powder is irradiated with a laser beam or an electron beam. This irradiation melts particles of the additional metal powder, and the particles then solidify. Such particles are bonded to each other through the melting and the subsequent solidification, and fresh bonded layers can be formed. The fresh bonded layers are also connected to the bonded layers formerly formed.

Repetition of the bonding by irradiation causes an aggregate of the bonding layers to gradually grow. Such stepwise growth produces a three-dimensional shaped article. A complicatedly shaped article can be readily produced by the additive manufacturing method. PTL 1 (JP4661842B) discloses an example additive manufacturing method.

The material for the metal molds is generally steel. Examples of the steel suitable for the metal molds include SKD4, SKD5, SKD6, SKD61, SKD62, SKD7 and SKD8 as defined in Japanese Industrial Standard (JIS).

General metal molds have flow channels of coolant therein. In the conventional process of producing the metal molds, ingots are plastically deformed, such as forged and rolled, to yield bulks of base materials. The flow channels are then formed inside the base materials through, for example, a machining process. However, this machining process has less flexibility on selection of the shape and geometry of the channels.

PTL 2 (JP2015-209588A) discloses a metal mold produced by additive manufacturing. The use of the additive manufacturing can lead to the ready production of metal molds that have complicated shape and geometry of the channels.

CITATION LIST

Patent Literatures

PTL 1: JP4661842B
PTL 2: JP2015-209588A

SUMMARY OF INVENTION

The production of metal molds by additive manufacturing readily causes solidification cracking. Prevention of the solidification cracking is an urgent need for the production of metal molds through the methods of manufacturing shaped articles involving a rapid melt-quenching solidification process.

An object of the present invention is to provide a powder for metal molds that is less likely to cause solidification cracking even in a process involving rapid melt-quenching solidification.

The present invention provides the following items:
[Item 1]
A powder made of an alloy for metal molds, the alloy comprising:
  C in an amount of 0.25 mass % to 0.45 mass %,
  Si in an amount of 0.01 mass % to 1.20 mass %,
  Mn in an amount of more than 0 mass % to 1.50 mass %,
  Cr in an amount of 2.0 mass % to 5.5 mass %,
  V in an amount of 0.2 mass % to 2.1 mass %,
  at least one of Mo in an amount of more than 0 mass % to 3.0 mass %, W in an amount of more than 0 mass % to 9.5 mass %, and Co in an amount of more than 0 mass % to 4.5 mass %, and
  the balance being Fe and incidental impurities,
  wherein the powder satisfies the following expression:

$$(Mn\ \%)^3/S\ \% > 6.7$$

where Mn % represents the Mn content (mass %) and S % represents the S content (mass %), and
  wherein the total content of P, S and B is 0.020 mass % or less.
[Item 2]
The powder for metal molds according to item 1, wherein the powder has a mean particle diameter D50 of 10 μm to 150 μm and a 90% particle diameter D90 of 200 μm or less.
[Item 3]
The powder for metal molds according to item 1 or 2, wherein the alloy comprises Mn in an amount of 0.20 mass % to 1.50 mass %.
[Item 4]
The powder for metal molds according to any one of items 1 to 3, wherein the alloy comprises at least one of Mo in an amount of 0.2 mass % to 3.0 mass %, W in an amount of 0.5 mass % to 9.5 mass %, and Co in an amount of 0.5 mass % to 4.5 mass % Co.

The inventive powder for metal molds is less likely to cause solidification cracking even in a process involving rapid melt-quenching solidification. The metal molds having complicated structures can be produced from the inventive powder.

DESCRIPTION OF THE INVENTION

In the production of metal molds through additive manufacturing, metal rapidly melts and rapidly solidifies. The alloy undergoes a rapid solidification process different from an equilibrium process. The δ phases deposit as primary crystals in an equilibrium state, whereas the γ phases deposit as primary crystals in additive manufacturing involving rapid solidification. Since the γ phase has a lower solubility of impurity elements, such as P, S and B, than the δ phase, the impurity elements are discharged into a liquid phase and segregate at the final solidification stage of the residual liquid phase.

In the additive manufacturing, an internal stress is generated caused by solidification shrinkage. The internal stress concentrates on the crystal grain boundaries.

In the production of metal molds with steel used in conventional metal molds through additive manufacturing, a martensitic structure is generated due to rapid quenching of the metal. This structure causes poor toughness of the product.

The present inventor has found that such factors cause solidification cracking at the crystal grain boundaries during the production of metal molds.

The inventive powder for the metal molds consists of agglomerates of multiple particles. These particles are made of an alloy. The alloy may contain C, Si, Mn, Cr and V. The alloy may further contain one or more of Mo, W, and Co. The balance in the alloy is Fe and incidental impurities. The function of each element in this alloy will now be described in detail.

[Carbon (C)]

C is an essential element that can be dissolved in Fe to enhance the strength of the alloy. In addition, C forms MC carbides with V, and also forms M6C carbides or M7C carbides with, for example, Cr and Mo. These carbides can enhance the strength of the alloy in a high temperature environment. From these viewpoints, the C content is preferably 0.25 mass % or more, more preferably 0.28 mass % or more, particularly more preferably 0.30 mass % or more. An excess content of C causes continuous precipitation of the carbides at the crystal grain boundaries. The precipitation leads to embrittlement at the crystal grain boundaries and a reduction in toughness at the crystal grain boundaries. From these viewpoints, the C content is preferably 0.45 mass % or less, more preferably 0.43 mass % or less, particularly more preferably 0.41 mass % or less. Accordingly, the C content is preferably 0.25 mass % to 0.45 mass %, more preferably 0.28 mass % to 0.43 mass %, further more preferably 0.30 mass % to 0.41 mass %.

[Silicon (Si)]

Si is an essential element that is added as a deoxidizer in the adjustment of alloy composition. Si can be dissolved in Fe to enhance the strength of alloy. From this viewpoint, the Si content is preferably 0.01 mass % or more, more preferably 0.15 mass % or more, particularly more preferably 0.25 mass % or more. An excess content of Si reduces the oxidation resistance of the alloy in a high temperature environment. From this viewpoint, the Si content is preferably 1.20 mass % or less, more preferably 1.10 mass % or less, particularly more preferably 1.00 mass % or less. Accordingly, the Si content is preferably 0.01 mass % to 1.20 mass %, more preferably 0.15 mass % to 1.10 mass %, further more preferably 0.25 mass % to 1.00 mass %.

[Manganese (Mn)]

Mn is an essential element that forms MnS with S. The MnS is a high melting point compound. The formation of MnS reduces the amount of precipitation of a low melting point compound containing S, and suppresses the solidification cracking. From this viewpoint, the Mn content is preferably 0.20 mass % or more, more preferably 0.25 mass % or more, particularly more preferably 0.30 mass % or more. An excess content of Mn reduces the oxidation resistance of the alloy in a high temperature environment. From this viewpoint, the Mn content is preferably 1.50 mass % or less, more preferably 1.45 mass % or less, particularly more preferably 1.40 mass % or less. Accordingly, the Mn content is more than 0 mass % to 1.50 mass %, preferably 0.20 mass % to 1.50 mass %, more preferably 0.25 mass % to 1.45 mass %, further more preferably 0.30 mass % to 1.40 mass %.

[Chromium (Cr)]

Cr is an essential element that can be dissolved in Fe to enhance the strength of the alloy. In addition, Cr contributes to an improvement in oxidation resistance of the alloy. From these viewpoints, the Cr content is preferably 2.0 mass % or more, more preferably 2.3 mass % or more, particularly more preferably 2.5 mass % or more. An excess content of Cr reduces the strength of the alloy in a high temperature environment. From this viewpoint, the Cr content is preferably 5.5 mass % or less, more preferably 5.3 mass % or less, particularly more preferably 5.1 mass % or less. Accordingly, the Cr content is preferably 2.0 mass % to 5.5 mass %, more preferably 2.3 mass % to 5.3 mass %, further more preferably 2.5 mass % to 5.1 mass %.

[Vanadium (V)]

V is an essential element that contributes to secondary hardening by tempering of the metal molds. In addition, V contributes to an improvement in strength of the alloy in a high temperature environment. From these viewpoints, the V content is preferably 0.2 mass % or more, more preferably 0.3 mass % or more, particularly more preferably 0.4 mass % or more. From the viewpoint of the material cost of the alloy, the V content is preferably 2.1 mass % or less, more preferably 1.5 mass % or less, particularly more preferably 1.0 mass % or less. Accordingly, the V content is preferably 0.2 mass % to 2.1 mass %, more preferably 0.3 mass % to 1.5 mass %, further more preferably 0.4 mass % to 1.0 mass %.

[Molybdenum (Mo), Tungsten (W), and Cobalt (Co)]

As described above, C contributes to an improvement in strength of the alloy, whereas an excess content of C reduces the toughness of the alloy. Addition of Mo, W or Co with an appropriate content of C can achieve both high strength and high toughness. The alloy may contain only Mo without W and Co; the alloy may contain only W without Co and Mo; the alloy may contain only Co without Mo and W; the alloy may contain Mo and W without Co; the alloy may contain W and Co without Mo; the alloy may contain Co and Mo without W; or the alloy may contain Mo, W and Co.

Mo is an element that contributes to formation of fine carbide particles. Fine particles of carbides contribute to an improvement in strength of the alloy. From this viewpoint, the Mo content is preferably 0.2 mass % or more, more preferably 0.5 mass % or more, particularly more preferably 1.0 mass % or more. From the viewpoint of the material cost of the alloy, the Mo content is preferably 3.0 mass % or less, more preferably 2.5 mass % or less, particularly more preferably 2.0 mass % or less. Accordingly, the Mo content in the alloy is preferably more than 0 mass % to 3.0 mass %, more preferably 0.2 mass % to 3.0 mass %, further more preferably 0.5 mass % to 2.5 mass %, most preferably 1.0 mass % to 2.0 mass %.

W is an element that contributes to formation of fine carbide particles. Fine particles of carbides contribute to an improvement in strength of the alloy. From this viewpoint, the W content is preferably 0.5 mass % or more, more preferably 1.0 mass % or more, particularly more preferably 1.2 mass % or more. From the viewpoint of the material cost of the alloy, the W content is preferably 9.5 mass % or less, more preferably 9.1 mass % or less, particularly more preferably 8.5 mass % or less. Accordingly, the W content in the alloy is preferably more than 0 mass % to 9.5 mass %, more preferably 0.5 mass % to 9.5 mass %, further more preferably 1.0 mass % to 9.1 mass %, most preferably 1.2 mass % to 8.5 mass %.

Co is an element that dissolves in Fe to enhance the strength of the alloy. In addition, Co contributes to precipitation hardening. From these viewpoints, the content of Co is preferably 0.5 mass % or more, more preferably 1.0 mass % or more, particularly more preferably 1.5 mass % or more. From the viewpoint of the material cost of alloy, the content of Co is preferably 4.5 mass % or less, more preferably 4.1 mass % or less, particularly more preferably 3.5 mass % or less. Accordingly, the Co content in the alloy is preferably more than 0 mass % to 4.5 mass %, more preferably 0.5 mass % to 4.5 mass %, further more preferably 1.0 mass % to 4.1 mass %, most preferably 1.5 mass % to 3.5 mass %.

The total content of Mo, W and Co is more preferably 0.5 mass % to 17 mass %.

[Phosphor (P), Sulfur (S), and Boron (B)]

P, S and B are incidental impurities. In the inventive alloy for metal molds, P, S and B produce a liquid phase having a low melting point during solidification. In the manufacture of the metal molds through a process involving rapid melt-quenching solidification, an eutectic structure having a low melting point caused by P, S or B segregates at the crystal grain boundaries. This segregation facilitates solidification cracking. From the viewpoint of suppression of solidification cracking, the total content of P, S, and B is preferably 0.020 mass % or less, more preferably 0.017 mass % or less, particularly more preferably 0.015 mass % or less.

S forms FeS with Fe, and the formation of FeS causes solidification cracking. In contrast, the formation of MnS with Mn has a suppressive effect on solidification cracking. The ternary phase diagram of Fe—Mn—S and the experimental results indicate that FeS is less likely to be formed and the suppressive effect on solidification cracking can be achieved due to the formation of MnS if the following Expression is satisfied:

$$\text{Expression: } (\text{Mn \%})^3/(\text{S \%}) > 6.7,$$

where Mn % represents the Mn content (mass %), and S % represents the S content (mass %).

[Particle Diameter]

The mean particle diameter D50 of the powder is preferably 10 μm to 150 μm. The powder having a mean particle diameter D50 of 10 μm or more has superior flowability. From this viewpoint, the mean particle diameter is more preferably 20 μm or more, particularly more preferably 30 μm or more. The powder having a mean particle diameter D50 of 150 μm or less has a high filling rate in a container. Such powder can thus lead to a metal mold with high density. From this viewpoint, the mean particle diameter D50 is more preferably 120 μm or less, particularly more preferably 90 μm or less. Accordingly, the mean particle diameter D50 of the powder is preferably 10 μm to 150 μm, more preferably 20 μm to 120 μm, further more preferably 30 μm to 90 μm.

The 90% particle diameter D90 of the powder is preferably 200 μm or less. Powder having a particle diameter D90 of 200 μm or less can completely melt during rapid heating. Thus, the metal mold produced from such powder has few defects. From this viewpoint, the particle diameter D90 is more preferably 160 μm or less, particularly more preferably 140 μm or less. The lower limit of the particle diameter D90 is typically 20 μm, more typically 40 μm, further more typically 50 μm, which value is not essential. Accordingly, the particle diameter D90 is typically 20 μm to 200 μm, more typically 40 μm to 160 μm, further more typically 50 μm to 140 μm.

In the measurement of mean particle diameter D50 and 90% particle diameter D90, the cumulative curve of particles is given where the total volume of the powder is defined as 100%. The particle diameter at the point where the cumulative volume in the curve is 50% is determined to be D50. The particle diameter at the point where the cumulative volume in the curve is 90% is determined to be D90. The mean particle diameter D50 and D90 are measured by laser diffraction scattering. Suitable devices for this measurement include "Microtrack MT3000" (a laser diffraction/scattering type particle size distribution measuring device) available from Nikkiso Co., Ltd. Powder and water are poured into the cell in this device, and the particle diameter is determined based on light scattering behaviors on the particles.

[Atomization]

Examples of the method of manufacturing the powder include a water atomizing process, a single-roll quenching process, a twin-roll quenching process, a gas atomizing process, a disk atomizing process, and a centrifugal atomizing process. Preferred methods are a single-roll quenching process, a gas atomizing process, and a disk atomizing process. The powder may undergo, for example, mechanical milling. Examples of the milling process include a ball mill process, a bead mill process, a planetary ball mill process, an attritor process, and a vibrating ball mill process.

[Production of Metal Mold]

The metal mold is produced by a method of manufacturing shaped articles involving a rapid melt-quenching solidification process of powder. Examples of the method of manufacturing shaped articles include a three-dimensional additive manufacturing method, a thermal spraying method, a laser coating method, and a surfacing method. Typically, the metal mold is shaped by a three-dimensional additive manufacturing method.

3D printers can be used for this three-dimensional additive manufacturing method. In the additive manufacturing method, the spread alloy powder is irradiated with a laser beam or an electron beam. Upon irradiation, the particles in the powder are rapidly heated to rapidly melt and then to rapidly solidify. The particles are bonded to each other through the melting and the subsequent solidification. Irradiation is selectively applied to some portions of the powder. The unirradiated portions of the powder do not melt. A bonded layer is formed only in the irradiated portions.

Additional alloy powder is spread over the bonded layer. This alloy powder is also irradiated with a laser beam or an electron beam. Upon irradiation, the particles in the powder rapidly melt and then rapidly solidify. The particles in the powder are bonded to each other through the melting and the subsequent solidification, and a fresh bonded layer is formed. The fresh bonded layer is also connected to the bonded layer formerly formed.

Repetition of bonding by irradiation can gradually grow an aggregate of the bonded layers. This stepwise growth leads to a metal mold having a three-dimensional shape. This additive manufacturing method facilitates production of a metal mold having a large number of complicated channels of coolant. So-called solidification cracking is less likely to occur in these steps of melting and solidification.

EXAMPLES

The following examples will clarify the advantages of the present invention, although the present invention should not be construed as being limited based on the description of the examples.

[Production of Powder]

Raw material having a specified composition was heated and melted by high-frequency induction heating in an alumina crucible under vacuum. The molten material was discharged downward through a nozzle having a diameter of 5 mm at the bottom of the crucible. High-pressure argon or nitrogen gas was sprayed onto the molten material to yield powder. The detailed composition of each powder is shown in Table 1. In Table 1, Powder 1 to Powder 9 are Examples of the present invention, and Powder 10 to Powder 17 are Comparative examples.

[Shaping]

Each powder was used as raw material, and subjected to additive manufacturing with a three-dimensional additive manufacturing apparatus (EOS-M290) to produce each shaped product. All shaped products were a cubic, each side of which had a length of 10 mm.

[Evaluation of Cracking]

The shaped product was cut parallel to the shaping direction. The cross-section was observed with an optical microscope at a magnification of 100 folds. Microscopic images were photographed at five fields of view, and the number of cracks was counted by image analysis. The results are shown in Table 1.

[Relative Density of Shaped Product]

The density of the shaped product was calculated with the weight of the shaped product in air, the weight of the shaped product in water, and the density of water (by Archimedes density measurement). This density was divided by the theoretical density calculated from the powder components to calculate the relative density. The results are shown in Table 1.

TABLE 1

Results of evaluation

| Powder | C | Si | Mn | Cr | Mo | W | V | Co | P | S | B | Fe | $Mn^3 S$ | P + S + B |
|---|---|---|---|---|---|---|---|---|---|---|---|---|---|---|
| 1 | 0.30 | 0.30 | 0.50 | 2.50 | — | 5.30 | 0.35 | — | 0.008 | 0.010 | <0.001 | balance | 12.5 | <0.019 |
| 2 | 0.29 | 0.25 | 0.45 | 2.60 | — | 9.10 | 0.40 | — | 0.004 | 0.008 | 0.006 | balance | 11.4 | 0.018 |
| 3 | 0.40 | 1.00 | 0.70 | 5.10 | 1.30 | — | 1.00 | — | 0.003 | 0.010 | 0.005 | balance | 34.3 | 0.018 |
| 4 | 0.38 | 0.90 | 0.38 | 4.83 | 1.25 | — | 0.42 | — | 0.010 | 0.005 | 0.001 | balance | 11.0 | 0.016 |
| 5 | 0.38 | 1.00 | 0.48 | 4.90 | 1.40 | 1.30 | 0.40 | — | 0.005 | 0.010 | 0.002 | balance | 11.1 | 0.017 |
| 6 | 0.33 | 0.17 | 0.32 | 2.95 | 2.85 | — | 0.50 | — | 0.003 | 0.002 | 0.001 | balance | 16.4 | 0.006 |
| 7 | 0.41 | 0.40 | 0.60 | 4.50 | 0.40 | 4.10 | 2.00 | 4.10 | 0.010 | 0.008 | 0.001 | balance | 27.0 | 0.019 |
| 8 | 0.35 | 0.95 | 0.40 | 5.03 | 1.13 | 1.23 | 0.23 | — | 0.006 | 0.003 | <0.001 | balance | 21.3 | <0.010 |
| 9 | 0.38 | 0.90 | 1.10 | 5.20 | 1.18 | — | 1.08 | — | 0.003 | 0.015 | <0.001 | balance | 88.7 | <0.019 |
| 10 | 0.31 | 0.21 | 0.45 | 2.10 | — | 5.53 | 0.42 | — | 0.020 | 0.020 | 0.001 | balance | 4.6 | 0.041 |
| 11 | 0.33 | 0.30 | 0.40 | 3.10 | — | 8.90 | 0.31 | — | 0.025 | 0.014 | 0.008 | balance | 4.6 | 0.047 |
| 12 | 0.39 | 0.87 | 0.38 | 4.89 | 1.24 | — | 0.38 | — | 0.010 | 0.020 | 0.009 | balance | 2.7 | 0.039 |
| 13 | 0.40 | 0.90 | 0.29 | 5.38 | 1.48 | — | 1.08 | — | 0.009 | 0.025 | 0.004 | balance | 1.0 | 0.038 |
| 14 | 0.50 | 1.14 | 0.32 | 4.79 | 1.26 | 1.50 | 0.45 | — | 0.009 | 0.008 | 0.004 | balance | 4.1 | 0.021 |
| 15 | 0.31 | 0.29 | 0.80 | 3.08 | 2.98 | — | 0.68 | — | 0.008 | 0.009 | 0.015 | balance | 56.9 | 0.032 |
| 16 | 0.36 | 0.18 | 0.29 | 4.14 | 0.33 | 3.92 | 1.78 | 4.84 | 0.003 | 0.007 | 0.001 | balance | 3.5 | 0.011 |
| 17 | 0.037 | 0.90 | 0.50 | 5.11 | 1.35 | — | 0.45 | — | 0.020 | 0.004 | 0.001 | balance | 31.3 | 0.025 |

| Powder | D50 (μm) | D90 (μm) | Number of cracks | Relative density (%) |
|---|---|---|---|---|
| 1 | 32 | 50 | 3 | 100.15 |
| 2 | 90 | 140 | 4 | 100.21 |
| 3 | 20 | 43 | 13 | 100.03 |
| 4 | 82 | 113 | 6 | 100.09 |
| 5 | 41 | 103 | 8 | 100.06 |
| 6 | 78 | 123 | 5 | 100.05 |
| 7 | 142 | 189 | 7 | 100.01 |
| 8 | 35 | 53 | 0 | 100.35 |
| 9 | 25 | 48 | 2 | 100.18 |
| 10 | 33 | 58 | 78 | 99.68 |
| 11 | 64 | 105 | 103 | 99.52 |
| 12 | 104 | 183 | 115 | 99.43 |
| 13 | 25 | 48 | 96 | 99.44 |
| 14 | 27 | 50 | 150 | 99.23 |
| 15 | 40 | 86 | 98 | 99.38 |
| 16 | 165 | 223 | 139 | 99.01 |
| 17 | 20 | 53 | 89 | 99.21 |

The powder of each Example shown in Table 1 is superior in various properties. From these results, the present invention clearly exhibits the superiority.

The powder according to the present invention is also suitable for a 3D printer that powder is ejected from a nozzle. The powder is also suitable for a laser coating method that involves ejection of powder from a nozzle.

The invention claimed is:

1. An alloy powder for three-dimensional additive manufacturing of a shaped article, the alloy powder comprising:
C in an amount of 0.25 mass % to 0.45 mass %,
Si in an amount of 0.01 mass % to 1.20 mass %,
Mn in an amount of more than 0 mass % to 1.50 mass %, Cr in an amount of 2.0 mass % to 5.5 mass %,
V in an amount of 0.2 mass % to 2.1 mass %,
at least one of Mo in an amount of more than 0 mass % to 3.0 mass %, W in an amount of more than 0 mass % to 9.5 mass %, and Co in an amount of more than 0 mass % to 4.5 mass %, and
the balance being Fe and incidental impurities, wherein the powder satisfies the following expression:
$11.0 \leq (Mn\%)^3/S\% \leq 88.7$, wherein Mn % represents the Mn content in mass % and S % represents the S content in mass %, and
wherein the total content of P, S and B is 0.020 mass % or less, and the content of S is 0.002 mass % or more, and
wherein the powder has a mean particle diameter D50 of 10 μm to 150 μm and a 90% particle diameter D90 of 200 μm or less, and
wherein the alloy powder is subjected to three-dimensional additive manufacturing to form the shaped article, wherein the shaped article has a shape of a cube with 10 mm sides, and the shaped article has 13 or less cracks when viewed with an optical microscope at a magnification of 100× in five fields of view.

2. The alloy powder according to claim 1, wherein the powder has a mean particle diameter D50 of 10 μm to 150 μm and a 90% particle diameter D90 of 20 μm or more and 200 μm or less.

3. The alloy powder according to claim 1, wherein the alloy comprises Mn in an amount of 0.20 mass % to 1.50 mass %.

4. The alloy powder according to claim 1, wherein the alloy comprises at least one of Mo in an amount of 0.2 mass % to 3.0 mass %, W in an amount of 0.5 mass % to 9.5 mass %, and Co in an amount of 0.5 mass % to 4.5 mass % Co.

5. The alloy powder according to claim 2, wherein the alloy comprises Mn in an amount of 0.20 mass % to 1.50 mass %.

6. The alloy powder according to claim 2, wherein the alloy comprises at least one of Mo in an amount of 0.2 mass % to 3.0 mass %, W in an amount of 0.5 mass % to 9.5 mass %, and Co in an amount of 0.5 mass % to 4.5 mass % Co.

7. The alloy powder according to claim 3, wherein the alloy comprises at least one of Mo in an amount of 0.2 mass % to 3.0 mass %, W in an amount of 0.5 mass % to 9.5 mass %, and Co in an amount of 0.5 mass % to 4.5 mass % Co.

8. The alloy powder according to claim 5, wherein the alloy comprises at least one of Mo in an amount of 0.2 mass % to 3.0 mass %, W in an amount of 0.5 mass % to 9.5 mass %, and Co in an amount of 0.5 mass % to 4.5 mass % Co.

9. The alloy powder according to claim 1, wherein the shaped article has a relative density of 100.01% to 100.35%.

10. The alloy powder according to claim 1, wherein the powder satisfies the following expression:
$11.0 \leq (Mn\%)^3/S\% \leq 34.3$, wherein Mn % represents the Mn content in mass % and S % represents the S content in mass %.

11. The alloy powder according to claim 1, wherein the powder satisfies the following expression:
$11.0 \leq (Mn\%)^3/S\% \leq 27.0$, wherein Mn % represents the Mn content in mass % and S % represents the S content in mass %.

* * * * *